(12) United States Patent
Reveillon et al.

(10) Patent No.: US 10,661,890 B2
(45) Date of Patent: May 26, 2020

(54) BLADE WITH REDUCED TORSIONAL RIGIDITY, AND ROTOR EQUIPPED WITH SUCH A BLADE

(71) Applicant: AIRBUS HELICOPTERS, Marignane (FR)

(72) Inventors: Damien Reveillon, Avoine (FR); Laurent Bianchi, Marseilles (FR)

(73) Assignee: Airbus Helicopters, Marignane (FR)

( * ) Notice: Subject to any disclaimer, the term of this patent is extended or adjusted under 35 U.S.C. 154(b) by 1663 days.

(21) Appl. No.: 14/315,088

(22) Filed: Jun. 25, 2014

(65) Prior Publication Data

US 2015/0298802 A1  Oct. 22, 2015

(30) Foreign Application Priority Data

Jun. 26, 2013 (FR) ...................... 13 01500

(51) Int. Cl.
| | |
|---|---|
| *B64C 27/473* | (2006.01) |
| *F01D 5/14* | (2006.01) |
| *B64C 27/72* | (2006.01) |
| *B64C 11/20* | (2006.01) |

(52) U.S. Cl.
CPC ............ *B64C 27/473* (2013.01); *F01D 5/147* (2013.01); *B64C 2027/4736* (2013.01); *B64C 2027/7222* (2013.01); *B64C 2027/7266* (2013.01); *Y02T 50/34* (2013.01)

(58) Field of Classification Search
CPC ....... B64C 27/33; B64C 27/473; B64C 27/54; B64C 2027/4733; B64C 2027/4736; B64C 2027/7261; B64C 2027/7222; B64C 2027/7266; Y02T 50/34; Y02T 416/226; Y02T 416/229; F01D 5/147
See application file for complete search history.

(56) References Cited

U.S. PATENT DOCUMENTS

| | | | |
|---|---|---|---|
| 4,095,322 A | | 6/1978 | Scarpati et al. |
| 4,306,837 A | * | 12/1981 | Brogdon ................. B64C 27/82 416/134 A |

(Continued)

FOREIGN PATENT DOCUMENTS

| | | |
|---|---|---|
| DE | 1260985 | 2/1968 |
| EP | 0764764 | 3/1997 |

(Continued)

OTHER PUBLICATIONS

French Search Report for FR 1301500, Completed by the French Patent Office dated Apr. 3, 2014, 6 Pages.

*Primary Examiner* — David E Sosnowski
*Assistant Examiner* — Eric J Zamora Alvarez
(74) *Attorney, Agent, or Firm* — Brooks Kushman P.C.

(57) ABSTRACT

A blade of a rotor for a rotary-wing aircraft is equipped with an outer covering extending along the span of the blade. This outer covering is provided with an extrados skin and with an intrados skin defining a cavity. The blade also includes a structure that extends into the cavity and connects the blade to a hub of the rotor. The cavity is filled with a filling material that includes at least one partition parallel to a chord of the blade and at least two independent blocks of filling material filling the cavity, thereby allowing the reduction of the torsional rigidity along the span of the blade.

9 Claims, 3 Drawing Sheets

(56) References Cited

U.S. PATENT DOCUMENTS

| | | | |
|---|---|---|---|
| 4,381,902 A * | 5/1983 | Head | B64C 27/33 |
| | | | 416/134 A |
| 4,935,277 A | 6/1990 | Le Balc'h | |
| 4,990,205 A | 2/1991 | Barbier et al. | |
| 5,690,474 A * | 11/1997 | Byrnes | B64C 27/82 |
| | | | 416/134 A |
| 5,711,651 A * | 1/1998 | Charles | B64C 27/001 |
| | | | 244/17.13 |
| 6,168,379 B1 * | 1/2001 | Bauer | B64C 27/001 |
| | | | 244/215 |
| 2004/0169108 A1 | 9/2004 | Terpay | |
| 2006/0049302 A1 * | 3/2006 | Kennedy | B64C 27/473 |
| | | | 244/17.11 |
| 2010/0104437 A1 * | 4/2010 | Caraballoso | B64C 27/46 |
| | | | 416/89 |
| 2010/0278649 A1 * | 11/2010 | Kuntze-Fechner | |
| | | | B29C 70/545 |
| | | | 416/134 A |
| 2011/0211959 A1 | 9/2011 | Bianchi et al. | |
| 2012/0020801 A1 | 1/2012 | Zuardy et al. | |
| 2013/0089422 A1 * | 4/2013 | Brunken, Jr. | B64C 27/473 |
| | | | 416/23 |
| 2013/0177422 A1 | 7/2013 | Bianchi et al. | |

FOREIGN PATENT DOCUMENTS

| | | |
|---|---|---|
| EP | 2363342 | 9/2011 |
| EP | 2540620 | 1/2013 |
| FR | 2616409 | 12/1988 |
| FR | 2617119 | 12/1988 |
| FR | 2956856 | 9/2011 |

\* cited by examiner

BLADE WITH REDUCED TORSIONAL RIGIDITY, AND ROTOR EQUIPPED WITH SUCH A BLADE

CROSS REFERENCE TO RELATED APPLICATION

This application claims priority to French patent application No. FR 1301500 filed on Jun. 26, 2013, the disclosure of which is incorporated in its entirety by reference herein.

BACKGROUND OF THE INVENTION (1) Field of the Invention

The present invention relates to a blade with reduced torsional rigidity intended for a rotor, and to a rotor equipped with such a blade. More specifically, this blade is intended for an aircraft propeller, or for a tail rotor of a rotary-wing aircraft.

(2) Description of Related Art

Traditionally, a blade extends longitudinally along its span from a first extremity intended to be secured to a rotating hub of a rotor toward a second extremity known as the "free extremity". With regard to the rotor, it is understood that the blade extends radially from the first extremity toward the second extremity.

It should be noted that the term "longitudinal" is understood as referring to the direction of the span of the blade.

Furthermore, this blade extends transversely from a leading edge toward a trailing edge of the blade, along the chord of this blade. In particular, the blade includes an outer covering provided with a first skin in the vicinity of its extrados, for convenience referred to as the "extrados skin", and a second skin in the vicinity of its intrados, for convenience referred to as the "intrados skin".

Each blade of a rotor—such as a supporting rotor of a rotary-wing aircraft—produces lift during the rotary movement of this rotor, allowing the aircraft to be supported and even propelled. The lift developed by the rotor is greater or lesser, depending on the pitch angle of each rotor blade. The aerodynamic angle of incidence (i.e., the angle between the chord of the profile and the airflow) of each aerodynamic profile of the blade—for convenience referred to as the "profile"—of a section that is normal to the pitch-variation axis of the blade corresponds to a near-constant called the "wedge" of the profile at the pitch angle of the blade. This pitch-variation axis generally defines the longitudinal axis of the blade.

Under these conditions, one observes—starting at a threshold angle of incidence of a given profile (that is, of a cross-section of the blade)—a detachment of the airflows, particularly in the region of the leading edge or the trailing edge of this profile. This detachment may cause aerodynamic stalling of the blade, or even a sudden drop in its lift if this phenomenon propagates and persists in an area located between two profiles that define a critical surface along the span of the blade. Moreover, the detachment of the airflows generates vortices that cause an increase in the drag coefficient of the blade, while also causing vibrations.

To limit the detachments, one solution consists of allowing the blade to twist geometrically in relation to itself.

It should be noted that the geometric twisting of a blade can be defined by the angle formed between the chord of each profile of a section of the blade with a reference plane of the blade.

In practice, each profile of the blade can be twisted in relation to the pitch-variation axis of the blade, by an angle that is defined in relation to such a reference plane.

It is understood that for a given blade trajectory, the twisting directly affects the aerodynamic incidence of each profile. Under these conditions, the term "twist law" refers to the trend, along the span of the blade, of the twist angles obtained by construction. The twist law of a blade is immutable. This twist law is the result of a compromise that is accepted in order to satisfy the optimal functioning of the rotor in all flight regimes.

This twist law applies from the first extremity to the second extremity of the blade, along an axis known as the "twist axis", or else along a predefined curve. Obviously, the blade can be deformed due to the effect of the forces that are applied.

Today, in order to design the rotor blades of a rotary-wing aircraft, its major structural elements—which typically consist of spars, an outer covering, and possibly ribs—are sized so as to meet the performance requirements, such as, for example, the takeoff weight of the aircraft or the resistance of the blades to centrifugal forces.

Furthermore, a filling material—which usually consists of a foam—is inserted into the free spaces between these structural elements. This filling material makes it possible to impart compression rigidity in relation to the airflow applied to the covering of the blade, and also renders the blade torsionally rigid, primarily along its span.

For example, document FR 2616409 describes a blade made of composite materials that includes a longitudinal spar along the longitudinal axis of the blade. This spar is located essentially at the center of the blade, such that the blade includes two chambers, which are located between the spar and the leading edge of the blade and the trailing edge of the blade, respectively. This spar may also consist of two elements, with an additional chamber being located between these two elements. Because each chamber may be filled with foam, this blade possesses substantial mechanical strength, even in the region of torsional rigidity about the longitudinal axis of the blade.

It should be noted that document FR 2617119 describes a blade made of composite materials that includes a structural core; an approximate aerodynamic profile that ensures the structural strength of the blade; and a trim cover that forms the desired aerodynamic profile and that consists of an intrados skin and an extrados skin. Thus, a single structural core can be associated with multiple trim covers—that is, different aerodynamic profiles—with a layer of a conforming material filling the space between the structural core and the trim cover. Thus, such a blade, which consists of different aerodynamic profiles distributed along the span of the blade, has the same structural core and therefore the same mechanical characteristics, regardless of the structural cross-sections formed from those profiles. The structural core includes at least one longitudinal spar, which may be located in the vicinity of the leading edge and/or at the center of the blade; a rigid shell; and a filling material.

Document EP 0764764 relates to a blade that includes spars that are positioned both longitudinally and transversely between an intrados skin and an extrados skin of the blade, with the spaces between the spars being filled with foam. The rigidity of the blade, as obtained through the use of these spars, allows the blade to remain functional after local impacts that affect the blade and that, in particular, destroy certain areas between these spars. Such a blade that includes spars that are positioned both longitudinally and transversely possesses very substantial rigidity, in order to be able to remain functional after such impacts.

Generally, when a blade is developed, the majority of the mechanical characteristics that are desired for the effectiveness of the blade—such as its shear stability (i.e., its ability to withstand shear forces and torque), its longitudinal rigidity in the flexion direction, and its fatigue strength or even its mass, do meet the stated expectations.

Optimization of the torsional rigidity about a longitudinal axis of a blade is a design stage that demands very close attention. Indeed, if the blade lacks torsional rigidity about this longitudinal axis, it will be too flexible, such that it will be deformed and will twist excessively due to the effect of aerodynamic forces. Thus, its aerodynamic performance will be significantly degraded. Conversely, if the blade is torsionally too rigid about this longitudinal axis, it will not be deformed and will not twist due to the effect of aerodynamic forces. However, substantial amounts of vibration may occur, as well as the detachment of airflows, particularly along the leading edge or the trailing edge of the blade, thereby causing aerodynamic stalling of the blade.

This torsional rigidity of the blade can be partially offset through active modification of the twisting of the blade— that is, while the aircraft is in flight. For example, one or more movable flaps may be added locally to the extension of the trailing edge of the blade, so as to cause this active twisting due to the effect of aerodynamic forces. Piezoelectric fibers may also be incorporated into the extrados skin and/or the intrados skin of the blade. Alternatively, the extrados and intrados skins of the blade may be made, at least locally, of anisotropic composite materials. Such blades are usually referred to as "active-twist blades", in contrast to traditional blades, whose twist is obtained by construction and is permanently set.

Obviously, such techniques for the active twisting of a blade are complex, in terms of both their manufacture and their implementation. In order to achieve the desired active twisting, these techniques also employ units or elements that are dedicated specifically to this task—such as actuators or flaps that significantly increase the mass of the blade, which is undesirable for the rotary wing of aircraft.

Furthermore, document FR 2956856 describes a so-called "adaptive-twist blade" that includes a leaf consisting of a stack of unidirectional composite layers that are anti-symmetrical in relation to a median layer, with the said stack of unidirectional composite layers being provided with a variable number of layers along the span of the blade. First and second attachment means secure this leaf to the intrados skin and to the extrados skin, respectively, of the outer covering. Each attachment means extends into the cavity along a longitudinal direction that is parallel to the span of the blade. Then, during flight, this adaptive-twist blade can twist as a result of the twisting of the leaf due to the effect of centrifugal forces. Thus, one can speak of the blade's "adaptation to twisting"—that is, its ability to twist during flight without the use of active-twist means.

The design of a blade can also be modified in order to adjust the torsional rigidity of the blade. However, such modifications face two major difficulties.

First, this torsional rigidity cannot easily be modified without affecting the other mechanical characteristics of the blade that are essential to its proper operation. Indeed, any elementary modification of the blade intended to reduce or increase its torsional rigidity will modify other mechanical and mass-related characteristics of the blade. For example, the thicknesses of the covering of the blade, as well as the composition of the covering, can be changed. Alternatively, the filling material can be changed, in order to modify the torsional rigidity of the blade. However, this modification may affect the longitudinal rigidity of the blade. Thus, such a modification intended to adjust the torsional rigidity of the blade usually entails the development of a new blade.

Next, this torsional rigidity that is unfavorable to the proper operation of the blade is usually detected during rotation tests performed on a test bench, or even during flight tests of a prototype—that is, when the development of the blade is well advanced. Consequently, modifying the torsional rigidity of a blade has a very significant negative effect on the development of the blade, by increasing not only its development cost but also the duration of the research phase.

Therefore, the goal of the present invention is to propose a blade that overcomes the above-mentioned limitations, specifically by separating the torsional rigidity of the blade from its other mechanical characteristics, so as to obtain reduced torsional rigidity of the blade about its longitudinal axis without significantly modifying its other mechanical characteristics.

According to the invention, a blade with reduced torsional rigidity intended for a rotor includes an outer covering extending along the span of the blade of a first extremal area to a second extremal area, and also structural means.

The first extremal area is located near the first extremity of the blade, which is suitable for being secured to a rotor hub, while the second extremal area is located in the vicinity of the second, free extremity of the blade.

This blade with reduced torsional rigidity is intended particularly for an aircraft propeller blade or for a rotor of a rotary-wing aircraft, and, more specifically, for a tail rotor.

According to a first embodiment of the invention, this blade with reduced torsional rigidity is particularly well suited to an adaptive-twist blade, as described in document FR 2956856. The twisting of such an adaptive-twist blade with reduced torsional rigidity is, on the one hand, obtained by construction, and, on the other hand, modified while the aircraft is in flight.

Nevertheless, according to a second embodiment of the invention, this blade with reduced torsional rigidity may be adapted to a traditional blade—namely, a blade that obeys a twist law, and whose twist is obtained by construction and is permanently set.

Regardless of the embodiment of the invention, the outer covering of this blade includes an extrados skin and an intrados skin, which may jointly constitute either one single skin or two separate skins. This outer covering defines a cavity that is located between the extrados skin and the intrados skin.

BRIEF SUMMARY OF THE INVENTION

The structural means of the blade extend into the interior of the cavity of the blade, connecting the blade to a rotor hub. Furthermore, a filling material, which usually consists of a foam, is inserted into this cavity.

This blade with reduced torsional rigidity is noteworthy in that the filling material includes at least one partition parallel to a chord of the blade. In fact, the cavity is filled by at least two independent blocks of filling material.

Indeed, the structural means and the outer covering essentially define the mechanical characteristics of this blade. Furthermore, the filling material inserted into the cavity of the blade enables the stabilization of the outer covering, by imparting compression rigidity in relation to the airflow applied to the said outer covering. Conversely, this filling material also imparts torsional rigidity to the blade about its longitudinal axis.

This torsional rigidity may be detrimental to the proper operation and to the good aerodynamic performance of the blade.

According to the first embodiment of the invention (that is, for an adaptive-twist blade), this torsional rigidity, although necessary, may counteract the twisting of the blade during flight, thereby degrading the good aerodynamic performance of this adaptive-twist blade.

Indeed, the filling material inserted into the cavity of the adaptive-twist blade imparts torsional rigidity to the blade, while also allowing the outer covering and the structural means to be deformed in a nearly similar manner when the blade is twisted.

Accordingly, the presence of the filling material supports the control of this twisting, such that the direct link that is created between the deformations of the outer covering and of the structural means enables better transmission of torsion torque between the structural means and the outer covering. Thus, it can be inferred that the torsional rigidity of the blade is necessary in order for the twist to be controlled.

However, if this rigidity is too great, it may counteract any deformation of the blade, thereby acting as a brake on this twisting.

Thus, in an unexpected way, the presence of one or more transverse partitions in the filling material of the blade according to this first embodiment of the invention makes it possible to reduce the torsional rigidity of the blade about its longitudinal axis, thereby encouraging the twist adaptation of this blade, such that the longitudinal axis of the blade can be essentially the same as the twisting axis of the blade.

Thus, in this first embodiment, this reduction in the torsional rigidity of the blade according to the invention advantageously makes it possible to retain this concept of controlling the twisting of the blade, while reducing the braking effect on this twisting.

Advantageously, because the filling material is not a structural element of the blade, the primary mechanical characteristics of the blade (apart from its torsional rigidity) are not affected by the presence of these partitions. Thus, a blade with reduced torsional rigidity according to the invention makes it possible, without modifying the primary mechanical characteristics of the blade, to retain the advantages (such as, for example, compression rigidity) of this filling material filling the cavity of the blade, doing so while minimizing its drawbacks, such as the increase in torsional rigidity.

In fact, for this first embodiment of the invention, which relates to an adaptive-twist blade, the twisting of the blade during flight is encouraged by the presence of one or more partitions. In this case, the blade preferably includes a plurality of partitions, so as to diminish substantially the torsional rigidity of the blade about its longitudinal axis, which axis is usually essentially the same as its twisting axis.

According to this first embodiment of the invention, the structural means of the adaptive-twist blade with reduced torsional rigidity include a leaf that extends into the cavity along the span of the blade. This leaf includes an anisotropic composite material, so that it can twist due to the effect of centrifugal forces (F) when the blade is rotating. This leaf is secured to the outer covering by first attachment means and by second attachment means, in order to twist the outer covering. This leaf also links the blade to the rotor hub.

The leaf of this blade may include a stack of unidirectional composite layers that are anti-symmetrical in relation to a median layer, with the said stack of unidirectional composite layers being provided with a variable number of layers along the span of the blade.

This leaf may also include a forward area near the leading edge of the blade and a rear area near the trailing edge of the blade. The first attachment means secure the forward area to one of the intrados and extrados skins of the outer covering, and the second attachment means secure the rear area to the other skin of the outer covering (i.e., the one to which the forward area is not secured). Thus, each intrados or extrados skin is secured, respectively, to one single attachment means. The first attachment means extend into the cavity along a first longitudinal direction (D1) parallel to the span of the blade, and the second attachment means extend into the cavity along a second longitudinal direction (D2) parallel to the span.

Last, this blade may include one or more longitudinal spars, with each spar thus linking the intrados skin and the extrados skin of the outer covering. For example, such a spar may be located in the vicinity of the leading edge of the blade or nearby.

According to the second embodiment of the invention (that is, for a traditional blade), the torsional rigidity of the blade may be the primary reason for the occurrence of major vibrations in the vicinity of the blade and of the rotor.

The unintended effects of the presence of one or more transverse partitions in the filling material of a blade according to the first embodiment of the invention may be transferred to the case of a traditional blade.

In fact, the presence of such transverse partitions in the filling material of the cavity of such a traditional blade makes it possible to reduce the torsional rigidity of the blade about its longitudinal axis. This reduction in torsional rigidity subsequently limits the onset of vibrations in such a traditional blade. Consequently, the operation of this blade is improved by the presence of these partitions.

According to the second embodiment of the invention, the structural means of the traditional blade with reduced torsional rigidity include one or more longitudinal spars. Each spar extends into the cavity of the blade along the span of the blade, and links the extrados skin to the intrados skin of the outer covering. Such a longitudinal spar links the blade to the rotor hub.

For example, a first spar extends along the leading edge of the blade and links the blade to the rotor hub, while a second spar may extend into the cavity of the blade, parallel to the first spar, or may be provided in the form of a ridge or hip on the trailing edge.

The structural means of the blade according to the invention may also include one or more transverse ribs. Each transverse rib extends into the cavity along the chord of the blade, i.e., generally perpendicular to the span of the blade. Each transverse rib generally links the extrados skin and the intrados skin of the outer covering.

Furthermore, the number of partitions in the filling material of the blade directly affects the torsional rigidity of the blade. As the number of partitions increases, the torsional rigidity of the blade is further reduced. For example, a small number of partitions makes it possible to obtain a slight decrease in torsional rigidity, especially for a traditional blade. Furthermore, a significant reduction in the torsional rigidity of the blade can be obtained by providing a plurality of partitions, in order (for example, in the case of an adaptive-twist blade) to encourage the in-flight adaptation of the blade to the twisting.

Similarly, the position of these partitions along the span of the blade also has an important effect on the torsional rigidity of the blade. Accordingly, the greater the number of partitions in the filling material in a given area of the blade along its span, the further the torsional rigidity of this area of the blade will be reduced. Advantageously, if the blade is intended to twist differently depending on its various spanwise areas, each area may include different numbers of partitions. Therefore, the spanwise length of the blocks of filling material may differ along the entire length of the blade. As a result, the torsional rigidity of the blade is not permanently set, but will vary depending on the spanwise areas of the blade.

In order to obtain different torsional rigidities in different spanwise areas of the blade, filling materials possessing different characteristics may also be used, with two blocks of these filling materials being separated by a partition according to the invention. For example, because this filling material consists of a foam, a rigid and dense foam is used at the base of the blade in order to obtain substantial torsional rigidity. This foam becomes more flexible and less dense as it approaches the free end of the blade.

Furthermore, the addition of these partitions (which has the effect of severing the filling material that is present in the cavity of the blade), along with the selection of their number and their locations, provides a margin of variation in the torsional rigidity of the blade along its longitudinal axis. Advantageously, this margin of variation in the torsional rigidity of the blade may give the designer of the blade greater flexibility in selecting the architecture of the blade, while limiting the inherent risks of this selection. Indeed, this margin with regard to the torsional rigidity of the blade may be applicable even at the end of the development phase, without affecting the other mechanical characteristics of the blade.

Furthermore, regardless of the embodiment, active twisting means may be added to such blades according to the invention so that the twisting of the blade can be modified actively (i.e., while the aircraft is in flight). The active twisting of such a blade is facilitated by the presence of partitions in the filling material of the blade. For example, these active twisting means may consist of one or more movable flaps added locally to the extension of the trailing edge of the blade. They may also consist of piezoelectric fibers incorporated into the extrados skin and/or into the intrados skin of the blade.

Moreover, independently of these embodiments of the invention, micro-shifts may occur between two adjacent blocks of filling material, in the vicinity of each partition. Consequently, in order to prevent these blocks of filling material from becoming worn due to the friction caused by these micro-shifts, an interface whose base consists of a material with a low friction coefficient, or of an anti-adhesive material such as Teflon® is inserted next to each partition.

This interface may consist of a strip inserted into each partition in order to separate two adjacent blocks. This strip is preferably secured to one block, for example, by gluing.

This interface may also consist of two strips inserted into each partition in order to separate two adjacent blocks, with one strip being secured respectively to each of the two adjacent blocks.

This strip is preferably thin.

In addition to a blade, the invention also relates to an aircraft rotor, which rotor is equipped with a hub and with a plurality of blades, each of which is a blade with reduced torsional rigidity as described hereinabove.

This rotor may constitute an aircraft propeller or else a rotor of a rotary-wing aircraft, including, in particular, a tail rotor of a rotary-wing aircraft.

BRIEF DESCRIPTION OF THE SEVERAL VIEWS OF THE DRAWINGS

The invention and its advantages will become clear in greater detail within the scope of the following description, which includes examples of embodiments provided for illustrative purposes, with reference to the attached figures, among which.

Elements that appear in two or more different figures are indicated by the same reference number.

It should be noted that three directions—X, Y, and Z—that are orthogonal to each other are indicated in the figures.

Direction X is known as the transverse direction. The term "width" refers to a transverse dimension of the blade in this transverse direction X.

Another direction (direction Y) is known as the reference direction, insofar as the blade extends in this direction Y. The directions that are known as the longitudinal directions are parallel to this reference direction.

Last, a third direction (direction Z) is known as the elevation direction, and corresponds to the height dimensions of the structures being described. The term "thickness" refers to an elevational dimension along this elevation direction.

DETAILED DESCRIPTION OF THE INVENTION

In a manner shared by both embodiments of the invention, a blade (1) extends from a first, fixed extremity (1') secured to a hub (110) of a rotor (100) of an aircraft toward a second, free extremity (1").

This blade (1) includes an outer covering (2) that extends from a first extremal area (3) near the first extremity (1') of the blade (1) toward a second extremal area (4) in the vicinity of the second extremity (1") of the blade (1). This outer covering (2) is provided with an extrados skin (2') and an intrados skin (2"), which jointly define a cavity (8) inside the outer covering (2). Thus, the outer covering (2) is at least partially hollow.

The blade (1) includes a first spar (61) extending into the cavity (8) along a longitudinal reference direction (Y) parallel to the pitch-variation axis (AY) and located on the leading edge (20) of the blade (1), between the extrados skin (2') and the intrados skin (2"). A filler material, such as a foam, is placed inside the cavity (8).

Figure 1:
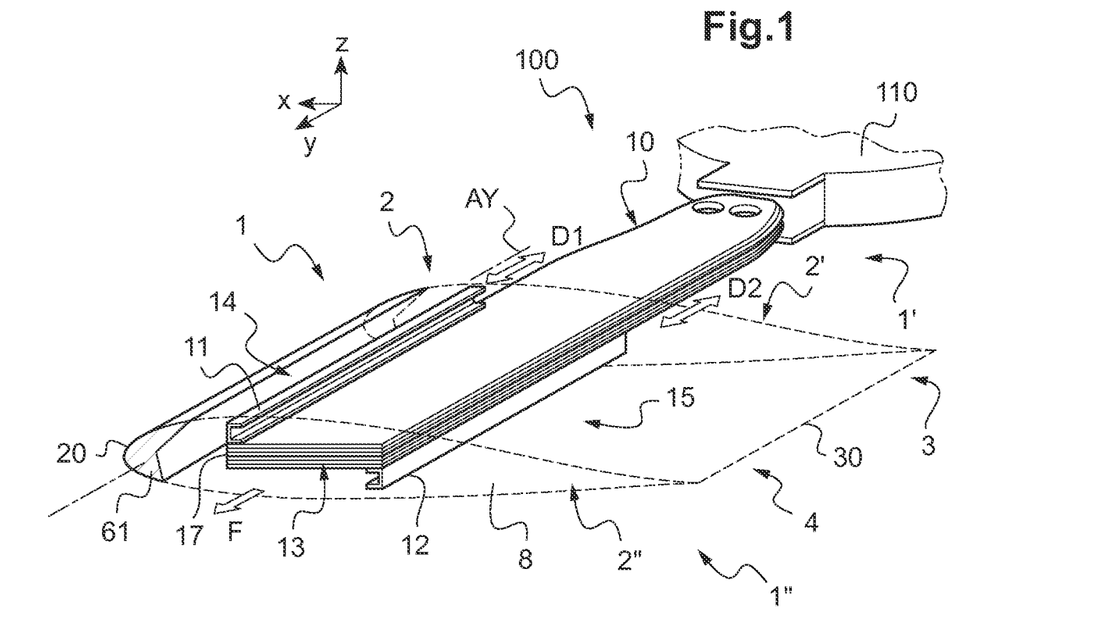
FIG. 1 is a view of a first embodiment of a blade according to the invention.

With references specifically to the first embodiment of the invention, and as shown in FIG. 1, the first spar (61) is limited to a position between the first extremal area (3) and the second extremal area (4) of the outer covering (2). The cross-section of this first spar (61) is minimized, because its primary function is not structural, but rather consists essentially of protecting the blade (1) against impacts.

The structural means of this blade (1) include a leaf (10) extending into the cavity (8) along a longitudinal direction (Y), from the second extremal area (4) toward the first extremal area (3). Furthermore, this leaf (10) protrudes from the first extremal area (3) of the outer covering (2) in order to be secured to the hub (110). It should be noted that a sleeve may be provided between the leaf (10) and the hub (110), or else the leaf (10) may be linked to a collar that forms an integral part of the blade (1) and that extends the outer covering (2) in order to be secured to the hub (110).

Furthermore, the leaf (10) is linked to the outer covering (2) by first attachment means (11) and by second attachment means (12). The second attachment means (12) are shifted in relation to the first attachment means (11) along the chord of the blade (1).

Furthermore, it should be noted that the first attachment means (11) extend into the cavity (8) along a first longitudinal direction (D1) parallel to the pitch-variation axis (AY), and the second attachment means (12) extend into the cavity (8) along a second longitudinal direction (D2) parallel to the pitch-variation axis (AY).

As shown in FIG. 1, the first attachment means (11) include a single continuous profile, which, for example, may be U-shaped. Similarly, the second attachment means (12) also include a single continuous profile. However, according to a first variant of this first embodiment, the first and second attachment means (11) (12) may include a plurality of profiles that are distributed respectively along the longitudinal direction (D1) (D2).

With reference to FIGS. 1 through 4, the leaf (10) extends transversely from a forward area (14) in proximity to the leading edge (20) of the blade (1) toward a rear area (15) in proximity to the trailing edge (30) of the blade (1). The first attachment means (11) secure the forward area (14) to one of the skins (2') (2"), while the second attachment means (12) secure the rear area (15) to the other skin (2") (2'). Thus, each intrados or extrados skin is secured, respectively, to one single attachment means (11) (12).

Figure 3:
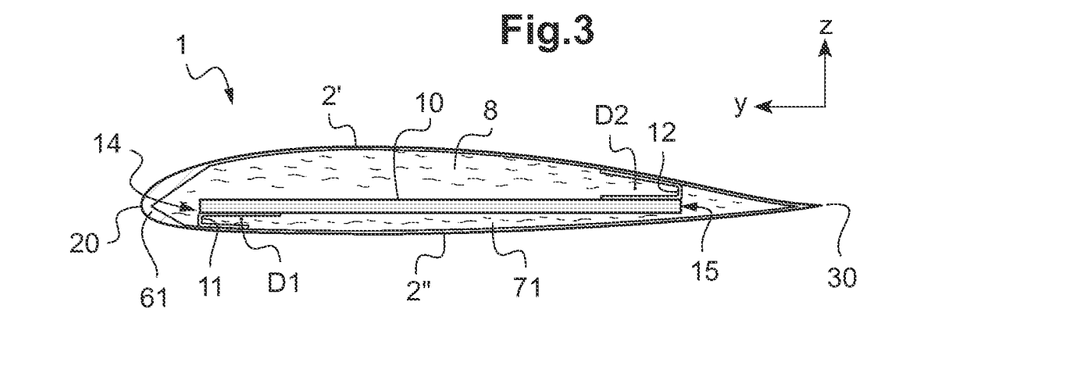
FIG. 3 is a cross-sectional view of a blade according to this first embodiment.

With reference to FIG. 3, according to the first embodiment of the invention, the first attachment means (11) join the forward area (14) to the intrados skin (2"), while the second attachment means (12) join the rear area (15) to the extrados skin (2').

Figure 4:
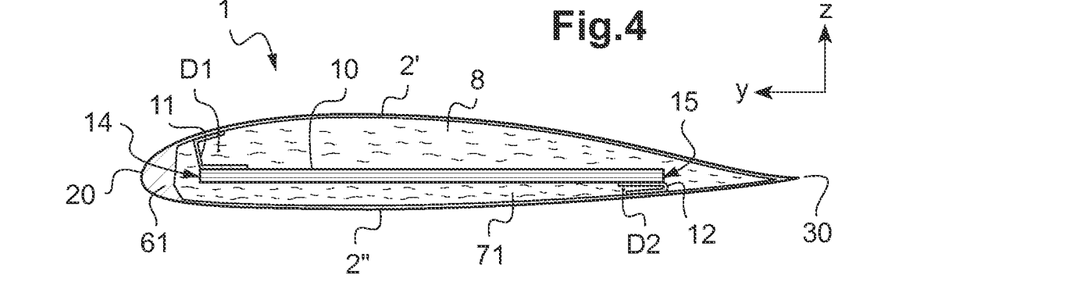
FIG. 4 is a cross-sectional view of a variant of this first embodiment.

With reference to FIG. 4, according to a second variant of this first embodiment, the first attachment means (11) join the forward area (14) to the extrados skin (2'), while the second attachment means (12) join the rear area (15) to the intrados skin (2").

Furthermore, the leaf (10) is implemented with the aid of an anisotropic composite material. In fact, a pull on the leaf (10), due to the effect of a centrifugal force (F) in reference direction (Y), along which the leaf (10) extends, generates a twist of this leaf (10). Similarly, compression of the leaf (10) causes a reverse twist, in the same way as a reduction in a given amount of pull.

Furthermore, in order to obtain optimized anisotropy, the leaf (10) includes a stack of unidirectional layers, each of which layers includes resistant fibers that are oriented parallel to a given direction. These fibers are embedded in a matrix (for example, a resin matrix) whose mechanical strength is lower.

Furthermore, the stack (13) includes a medial layer (17) extending in reference direction Y parallel to the pitch-variation axis (AY) of the blade (1). This medial layer (17) includes, for example, fibers that are oriented parallel to the longitudinal direction Y in order to convey the centrifugal force (F) to the hub (110). By definition, the medial layer (17) includes fibers oriented at 0° in relation to the longitudinal direction Y.

Thus, the blade (1) according to this first embodiment constitutes an adaptive-twist blade. In other words, it can twist during flight, as a result of the twisting of the leaf (10) due to the effective centrifugal forces.

Figure 5:
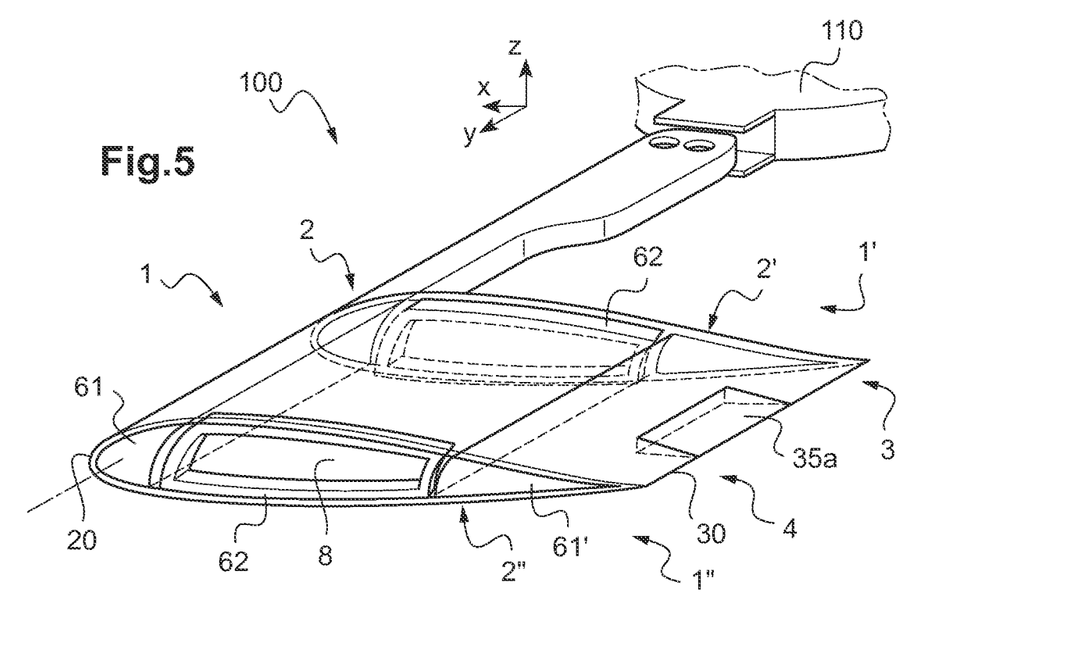
FIG. 5 is a view of a second embodiment of a blade according to the invention.

With references specifically to the second embodiment of the invention, and as shown in FIG. 5, the first spar (61) protrudes from the first extremal area (3) of the outer covering (2) in order to be secured to the hub (110). In the same way as with the first embodiment, a sleeve may be provided between the spar (61) and the hub (110); alternatively, the first spar (61) may be linked to a collar that forms an integral part of the blade (1) with this integrated collar extending the outer covering (2) in order to be secured to the hub (110).

Figure 6:
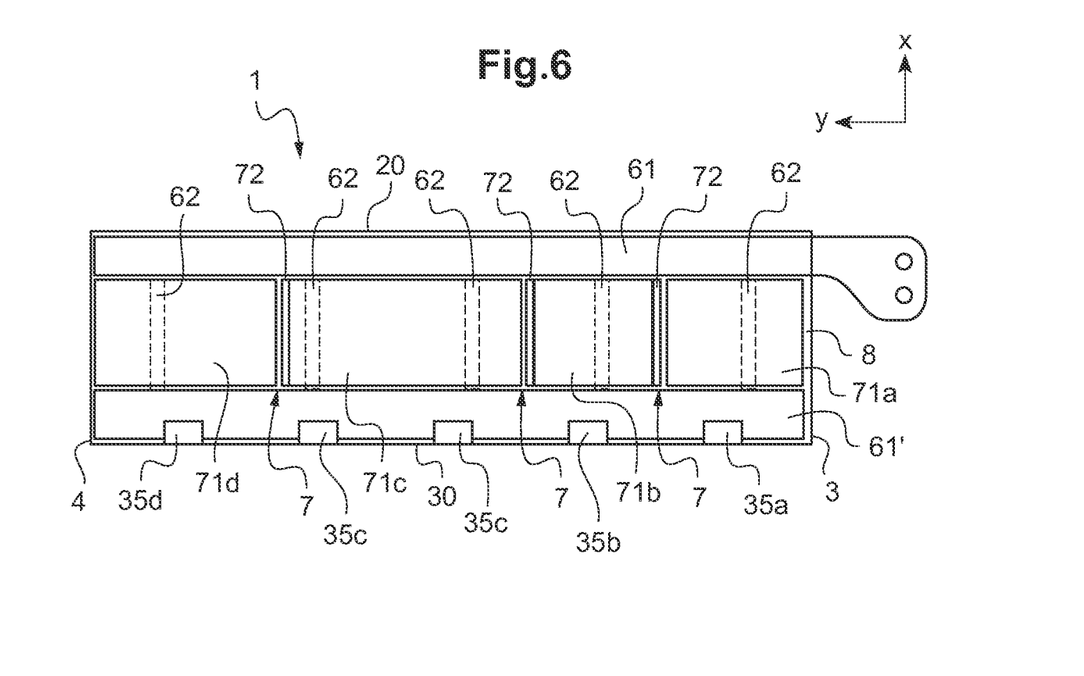
FIG. 6 is a diagram illustrating this second embodiment.
Figure 7:
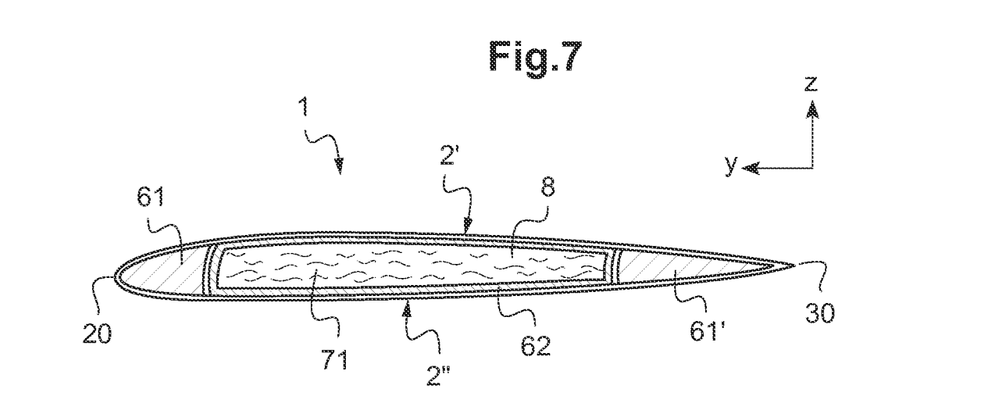
FIG. 7 is a cross-sectional view of a blade according to this second embodiment.

With reference to FIGS. 5 through 7, a second spar (61') extends into the cavity (8) along reference direction Y and is located near the trailing edge (30) of the blade (1), between the extrados skin (2') and the intrados skin (2").

The blade (1) also includes transverse ribs (62) extending into the cavity (8) in the transverse reference direction X, parallel to the chord of the blade (1). These ribs (62) extend transversely from the first spar (61) toward the second spar (61'), forming, in conjunction with the first and second spars (61) (61'), the structural means of this second embodiment. These ribs (62) are located between the extrados skin (2') and the intrados skin (2"). Furthermore, these ribs (62) are perforated, thereby allowing the filling material to fill the entirety of the cavity (8).

The blade (1) according to this second embodiment forms a traditional blade that obeys a twist law, and whose twist is obtained by construction and is permanently set.

The first and second spars (61) (61') form, in conjunction with the ribs (62), the structural means of the blade (1) according to the second embodiment of the invention. In contrast, according to the first embodiment, these structural means are formed by the blade (1), the first and second attachment means (11) (12), and the first spar (61).

Regardless of the embodiment of the invention, these structural means, in conjunction with the outer covering (2), define the major mechanical characteristics of the blade (1). Furthermore, the filling material inserted into the cavity (8) makes it possible to provide compression rigidity in relation to the airflow applied to the outer covering (2) of the blade (1), as well as torsional rigidity about the longitudinal direction Y. Conversely, this torsional rigidity may be detrimental to the good performance of the blade (1).

According to the first embodiment of the invention (which is an adaptive-twist blade), this torsional rigidity may counteract the twisting of the blade due to the effect of the aerodynamic forces, thereby degrading the good aerodynamic performance of the blade (1).

According to the second embodiment of the invention (which is a traditional blade), this torsional rigidity may be the primary reason for the occurrence of major vibrations in the vicinity of the blade (1) and of the rotor (100).

Figure 2:
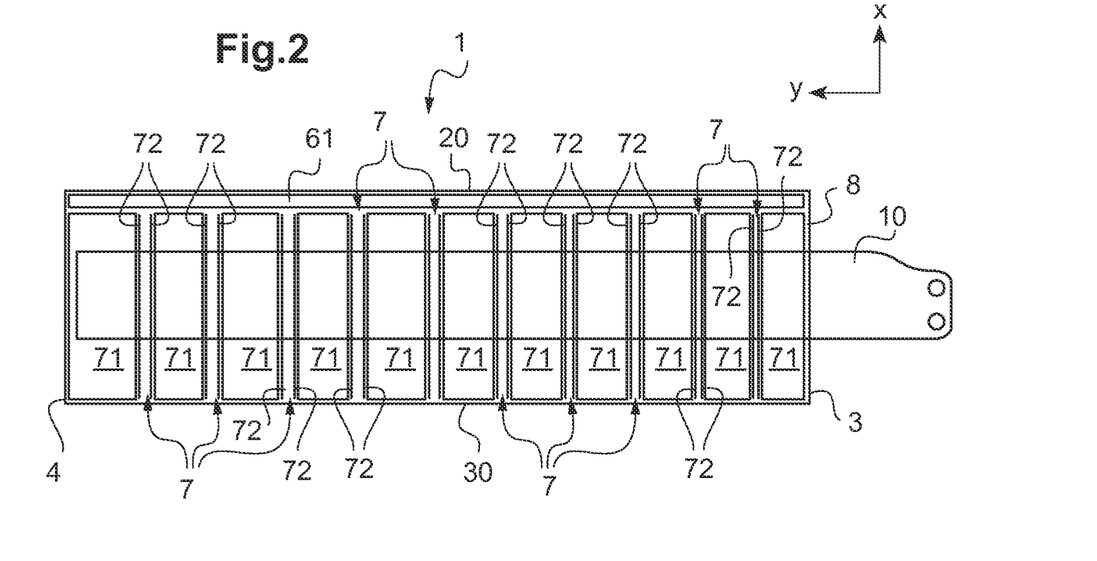
FIG. 2 is a diagram illustrating this first embodiment.

Furthermore, the blade (1) according to the invention, regardless of whether it reflects the first embodiment, as shown in FIG. 2, or the second embodiment, as shown in FIG. 6, includes several transverse partitions (7), which are parallel to the chord of the blade (1) and which divide the filling material that is present inside the cavity (8) into a plurality of independent blocks (71). The presence of these transverse partitions (7) makes it possible to reduce the torsional rigidity of the blade (1) about the longitudinal direction Y, without affecting the other mechanical characteristics of the blade.

Indeed, the cavity (8) of the blade (1) includes a plurality of independent blocks (71) made of filling material. In fact, these blocks (71) do not transmit torsion torque about the longitudinal direction Y. Consequently, the shear stresses that are present in the blade (1) due to this torsion torque are reduced.

Furthermore, the number of partitions (7) directly affects the torsional rigidity of the blade (1). For example, the blade (1) according to the first embodiment of the invention, as shown in FIG. 2, includes a large number of partitions (7) that are distributed over the entirety of the span of the blade (1), while a large plurality of blocks (71) made of filling material is present in the cavity (8). As shown in FIG. 2, the blocks (71) may be formed from a filling material with the same characteristic, e.g. rigidity and density, in each of the blocks (71). In fact, the torsional rigidity about the longitudinal direction Y of this blade (1) is noticeably reduced. This reduction in the torsional rigidity of the blade (1) is particularly worthwhile for the blade (1) according to this first embodiment, in that it encourages the twist adaptation of this blade (1) during the course of a flight.

Conversely, the blade (1) according to the second embodiment of the invention, as shown in FIG. 6, includes three partitions (7), while four blocks (71a) (71b) (71c) (71d) made of filling material are present in the cavity (8). These three partitions (7) make it possible to achieve a slight reduction in the torsional rigidity of this blade (1) about the longitudinal direction Y. Consequently, the vibrations that might be generated in the vicinity of the blade (1) are reduced, and the operation of the blade (1) is improved by the presence of these partitions (7).

In order to obtain different torsional rigidities in different spanwise areas of the blade (1), filling materials possessing different characteristics may also be used. For example, in the second embodiment of the invention, with reference to FIG. 6, the four blocks (71a) (71b) (71c) (71d) made of filling material consist of foams having different rigidities and densities. Accordingly, block (71a), which is located at the base of the blade, may possess a significant amount of torsional rigidity, while the other blocks (71b) (71c) (71d) are more flexible and less dense as they approach the free extremity of the blade (1). In fact, block (71d), which is located at the free extremity of the blade (1), is the most flexible and least dense block.

Moreover, active twist means may be added to the blade (1), not only for the first embodiment but also for the second embodiment of the invention. For example, as shown in FIG. 5 and FIG. 6, movable flaps (35) are added to the trailing edge (30) of the blade (1) according to the second embodiment of the invention. In particular, as shown in FIG. 6, at least one movable flap (35a) (35b) (35c) (35d) is positioned facing each block (71a) (71b) (71c) (71d) made of filling material.

Thanks to these movable flaps (35), the twisting of the blade (1) can be modified actively (i.e., while the aircraft is in flight). This active twisting of the blade (1) is also facilitated by the presence of partitions (7) in the filling material. These movable flaps (35) may also be located in the extension of the trailing edge of the blade (1).

Furthermore, micro-shifts may occur between two adjacent blocks (71) of filling material, in the vicinity of each partition (7). Consequently, in order to prevent these blocks (71) of filling material from becoming worn due to the friction caused by these micro-shifts, an interface (72) whose base consists of a material with a low friction coefficient, or of an anti-adhesive material such as Teflon,® is inserted next to each partition (7) between two adjacent blocks (71).

As shown in FIG. 6, this interface (72) consists of a strip that is inserted into each partition and secured to a block (71)—for example, by gluing. This strip, which is preferably thin, may consist entirely of such a material with a low friction coefficient, or else may simply possess a superficial deposit of such a material on the surface of this strip facing the block (71) to which the said strip is secured.

As shown in FIG. 2, this interface (72) consists of two strips that are inserted into each partition (7), with one strip being secured respectively to each of the said two adjacent blocks (71)—for example, by gluing. Each strip may consist entirely of such a material with a low friction coefficient, or else may simply possess a superficial deposit of such a material on the surface of this strip facing the block (71) to which the said strip is secured.

In addition to a blade (1), the invention also relates to an aircraft rotor (100), which rotor (100) is equipped with a hub (110) and with a plurality of blades (1). Each blade (1) of this rotor (100) is a blade (1) with reduced torsional rigidity as described hereinabove.

Specifically, this rotor (100) may constitute an aircraft propeller or else a rotor of a rotary-wing aircraft, including, in particular, a tail rotor of a rotary-wing aircraft.

Naturally, the present invention is subject to numerous variants in terms of its implementation. Although several embodiments have been described, it will be readily understood that not all of the possible modes can be identified exhaustively. Any of the means described herein may of course be replaced by equivalent means without departing from the scope of the present invention.

What is claimed is:

1. A rotor blade with reduced torsional rigidity, including:
   an outer covering extending along a pitch-variation axis of a first extremal area to a second extremal area, with the outer covering including an extrados skin and an intrados skin;
   structural means linking the blade to a hub of the rotor; and
   a cavity defined by the outer covering, with the cavity being filled by a filling material;
   wherein the filling material includes at least one partition parallel to a chord of the blade and at least two independent blocks made of filling material filling the cavity along a span of the blade; and
   wherein a strip is inserted into each partition in order to separate two adjacent blocks.

2. The blade according to claim 1, wherein the strip is secured to one single block.

3. The blade according to claim 1, wherein each strip consists of an anti-adhesive material with a friction coefficient being less than friction coefficients of the adjacent blocks.

4. A rotor blade comprising:
   an outer covering extending along a pitch-variation axis from a first extremal area to a second extremal area, the outer covering having an extrados skin and an intrados skin, the outer covering defining a cavity;
   a structural frame linking the blade to a hub of the rotor; and
   at least two blocks filling the cavity along a span of the blade and at least one partition, each partition positioned between and separating adjacent blocks, the partition being parallel to a chord of the blade, the at least two blocks formed from a filling material such that the at least two blocks have the same density, the at least two blocks and the at least one partition configured to provide a reduced torsional rigidity for the blade.

5. The blade according to claim 4, wherein the cavity is defined by and extends between the extrados skin and the intrados skin.

6. The blade according to claim 4, wherein each partition further comprises a strip separating adjacent blocks, wherein a friction coefficient of the strip is less than a friction coefficient of the blocks.

7. The blade according to claim 4, wherein the structural frame further comprises a spar extending into the cavity along the pitch-variation axis and linking the extrados skin and the intrados skin.

8. The blade according to claim 4, wherein the structural frame further comprises a leaf extending into the said cavity along the said pitch-variation axis, with the said leaf including an anisotropic composite material such that it is capable of twisting as a result of an effect of centrifugal forces when the said blade is rotating, with the said leaf being secured to the said outer covering by first attachment means and by second attachment means so as to be able to twist the said outer covering.

9. A rotor blade comprising:
an outer covering extending along a pitch-variation axis from a first extremal area to a second extremal area, the outer covering having an extrados skin and an intrados skin, the extrados skin and an intrados skin defining a cavity therebetween;
a structural frame configured to link the blade to a hub of the rotor, the structural frame comprising a leaf extending into the cavity along the pitch-variation axis, the leaf comprising a stack of unidirectional composite layers that are anti-symmetrical in relation to a medial layer such that the leaf is formed by an anisotropic composite material configured to twist in response to centrifugal forces when the blade is rotating;
first and second attachment members securing the structural frame to the outer covering such that the outer covering twists in response to the structural frame twisting; and
a series of blocks and a series of partitions, the series of blocks filling the cavity along a span of the blade and in contact with the extrados skin, the intrados skin, and the structural frame, wherein adjacent blocks are separated by a partition of the series of partitions positioned therebetween, each partition being parallel to a chord of the blade, wherein the series of blocks are formed from formed from a filling material such that each block has the same density, wherein the series of partitions are positioned spanwise to control torsional rigidity for the blade.

* * * * *